United States Patent
Zhou et al.

(10) Patent No.: US 12,510,615 B2
(45) Date of Patent: Dec. 30, 2025

(54) METHOD AND APPARATUS FOR OBTAINING T1-WEIGHTED AND SUSCEPTIBILITY-WEIGHTED IMAGING IMAGE

(71) Applicant: Siemens Healthcare GmbH, Erlangen (DE)

(72) Inventors: Kun Zhou, Shenzhen (CN); Wei Liu, Erlangen (DE)

(73) Assignee: Siemens Healthineers AG, Erlangen (DE)

( * ) Notice: Subject to any disclaimer, the term of this patent is extended or adjusted under 35 U.S.C. 154(b) by 65 days.

(21) Appl. No.: 18/217,755

(22) Filed: Jul. 3, 2023

(65) Prior Publication Data
US 2024/0004015 A1    Jan. 4, 2024

(30) Foreign Application Priority Data
Jul. 4, 2022   (CN) .......................... 202210777738.3

(51) Int. Cl.
*G01V 3/00*       (2006.01)
*G01R 33/56*      (2006.01)
*G01R 33/565*     (2006.01)

(52) U.S. Cl.
CPC ............... *G01R 33/56509* (2013.01); *G01R 33/5602* (2013.01)

(58) Field of Classification Search
CPC ............. G01R 33/287; G01R 33/4835; G01R 33/5608; A61B 2090/374
(Continued)

(56) References Cited

U.S. PATENT DOCUMENTS

2012/0262172 A1*  10/2012  Holmes .............. G01R 33/5602
                                                   324/309
2018/0017652 A1*  1/2018  Ye .................... G01R 33/56545
2018/0038933 A1   2/2018  Parrish et al.

FOREIGN PATENT DOCUMENTS

WO      2015084301 A1      6/2015
WO      WO-2018114554 A1 *  6/2018

OTHER PUBLICATIONS

Campbell-Washburn, Adrienne et al: "Opportunities in Interventional and Diagnostic Imaging by Using High-Performance Low-Field-Strength MRI," Radiology; vol. 293; No. 2; 1; pp. 384-393; XP055818849; Nov. 2019 (Nov. 1, 2019).

(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

A method and apparatus for obtaining T1-weighted and susceptibility-weighted imaging images may include in a 3D EPI process with a plurality of times of excitation, for each time of excitation, first performing radio frequency pulse excitation on target tissue, and simultaneously applying a slice selection gradient pulse to the target tissue in a slice selection encoding direction. When a preset T1W data acquisition time arrives, T1W data for an excited echo may be acquired. After the T1W data acquisition is completed, SWI data for the excited echo may be acquired. Image reconstruction may then be performed on T1W data acquired in all excitation processes to obtain a T1W image of the target tissue, and image reconstruction on SWI data acquired in all the excitation processes may be performed to obtain an SWI image of the target tissue. Both T1W data and SWI data can be obtained in one excitation process.

13 Claims, 3 Drawing Sheets

101 perform 3D echo planar imaging (EPI) process 102 performing image reconstruction on T1W data

(58) Field of Classification Search
USPC .......................................................... 324/309
See application file for complete search history.

(56) References Cited

OTHER PUBLICATIONS

Haacke EM, Xu Y, Cheng YC, Reichenbach JR. "Susceptibility Weighted Imaging (SWI)," Magnetic Resonance in Medicine 2004; 52 (3): 612-18.; 2004.
Jaco J.M. Zwanenburg et al. "Fast High-Resolution Whole Brain T2* Weighted Imaging Using Echo Planar Imaging at 7T," Neuroimage. 2011;56:1902-1907; 2011.
B.A. Poser et al. "Three-Dimensional Echo-Plannar Imaging at 7 Tesla," Neuroimage, 2010; 51:261-266; 2010.
P. Sati et al. "Ultra-Fast Acquisition of High-Resolution Susceptibility-Weighted-Imaging at 3T," Proc Intl Soc Mag Reson Med. 19, 2011; 2011.
Norbeck, Ola, et al. "Optimizing 3D EPI for Rapid T1-Weighted Imaging," Magnetic Resonance in Medicine 84.3: 1441-1455; 2020.

\* cited by examiner

METHOD AND APPARATUS FOR OBTAINING T1-WEIGHTED AND SUSCEPTIBILITY-WEIGHTED IMAGING IMAGE

CROSS REFERENCE TO RELATED APPLICATIONS

This patent application claims priority to Chinese Patent Application No. 202210777738.3, filed Jul. 4, 2022, which is incorporated herein by reference in its entirety.

BACKGROUND

Field

The present disclosure relates to the technical field of magnetic resonance imaging (MRI), and relates to a method and an apparatus for obtaining a T1-weighted (T1W) image and a susceptibility-weighted imaging (SWI) image, and an MRI system.

Related Art

In MRI, a radio frequency (RF) pulse of a specific frequency is applied to a human body in a static magnetic field, so that hydrogen protons in the human body are excited and a magnetic resonance (MR) phenomenon occurs. After the pulse is stopped, the protons generate an MR signal in a relaxation process, and an MR image is generated after a process in which processing such as receiving, spatial encoding, and image reconstruction is performed on the MR signal.

In an imaging process, after RF excitation, first, slice selection is completed by using a Z-direction gradient, that is, a slice for imaging is selected. Then, a Y-direction gradient magnetic field is switched on, so that precession speeds of magnetic moments at different Y positions are also different. Then, the Y gradient is switched off, so that the speeds of the magnetic moments at the positions are restored to the same. However, because different phase shifts are previously caused at the different Y positions due to the different precession speeds, this process is referred to as phase encoding. Next, an X-direction gradient is switched on, and speeds of magnetic moments at different X positions are different. This process is referred to as frequency encoding. At this point, positions of a 2D image can be determined through phase encoding and frequency encoding. A signal acquired by a receiver coil is a k-space signal, and an image can be obtained through a Fourier transform. Then, a new round of slice selection is completed by using the Z-direction gradient, and the above process is repeated, to obtain MRI images at other slices.

Different RF may be formed by using a combination of 90° RF and 180° RF. Commonly used MRI RF includes a spin-echo sequence (SE), a turbo spin-echo sequence (TSE), a gradient-echo sequence (GRE), and echo planar imaging (EPI). GRE and EPI are both gradient echoes. A gradient echo is generated through forward and reverse switching in a readout direction (an X direction) after one time of RF excitation. A difference between EPI and a common gradient echo is that after one time of RF excitation, continuous forward and reverse switching is performed on a readout gradient field, and one gradient echo is generated for each time of switching, and therefore there is an echo chain, similar to TSE.

In magnetic resonance imaging, after experiencing gradients of the same size and opposite directions, stationary tissues obtain a zero-phase accumulation. However, moving tissues, such as flowing blood or cerebrospinal fluid, that moves in a direction have a non-zero phase accumulation. When a next encoding gradient is applied, the moving tissue that already has a phase is incorrectly encoded, appears at another position, and becomes a flow artifact. Flow compensation (FC) is also referred to as gradient moment nulling (GMN), and is a technology that reduces or eliminates flow artifacts by using a specially designed gradient field. There are many gradient combination modes in FC technology. Through a plurality of instances of forward and reverse gradient field transformation at different areas, phase shifts of fluids at various speeds can finally approximate to zero, thereby eliminating motion artifacts. In general, FC nulls a first gradient moment to compensate for impact caused by uniform-speed flow.

Currently, a low-field MRI scanner is widely used, and the biggest feature of the low-field MRI scanner is a low signal-to-noise ratio. However, the signal-to-noise ratio is directly proportional to field strength of B0 (a main magnetic field), and a longer MR measurement time is required. As a result, an MR measurement throughput is reduced, and patient experience is deteriorated.

Brain imaging is very common in MRI examinations. Usually, conventional brain imaging requires T1-weighted (T1W) imaging, T2-weighted (T2W) imaging, T2 fluid attenuated inversion recovery (T2 FLAIR) imaging, diffusion-weighted imaging (DWI), and susceptibility-weighted imaging (SWI). Currently, these types of imaging all need to be achieved through independent scanning processes, and usually require a total scanning time of 10 to 20 minutes.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
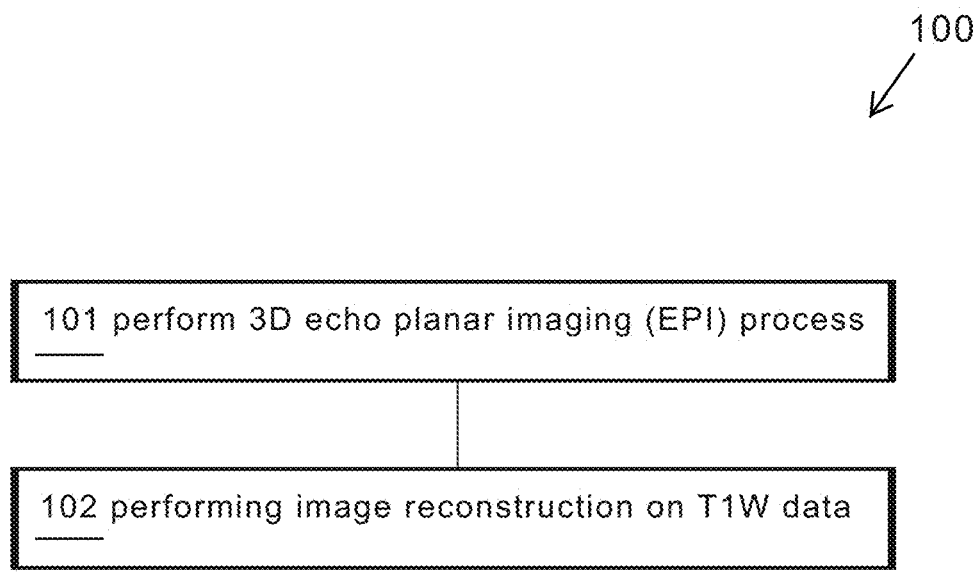
FIG. 1 is a flowchart of a method for obtaining a T1W image and an SWI image according to an exemplary embodiment of the present disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to provide a method for obtaining T1W and SWI images, and further provide an apparatus for obtaining T1W and SWI images and an MRI system, to obtain a T1W image and an SWI image at the same time.

A method for obtaining T1-weighted (T1W) and susceptibility-weighted imaging (SWI) images may include:
  in a 3D echo planar imaging (EPI) process with a plurality of times of excitation, for each time of excitation, first performing radio frequency pulse excitation on target tissue, and simultaneously applying a slice selection gradient pulse to the target tissue in a slice selection encoding direction; after the radio frequency pulse excitation and the slice selection gradient pulse application are completed, when a preset T1W data acquisition time arrives, acquiring T1W data for an excited echo; and after the T1W data acquisition is completed, when a preset SWI data acquisition time arrives, acquiring SWI data for the excited echo; and
  performing image reconstruction on T1W data acquired in all excitation processes to obtain a T1W image of the target tissue, and performing image reconstruction on SWI data acquired in all the excitation processes to obtain an SWI image of the target tissue.

Before the performing image reconstruction on T1W data acquired in all excitation processes, the method may further include: performing radio frequency pulse excitation on the target tissue, and simultaneously applying the slice selection gradient pulse to the target tissue in the slice selection encoding direction; after the radio frequency pulse excitation and the slice selection gradient pulse application are completed, when a preset T1W phase correction data acquisition time arrives, acquiring T1W phase correction data; and after the T1W phase correction data acquisition is completed, when a preset SWI phase correction data acquisition time arrives, acquiring SWI phase correction data.

The performing image reconstruction on T1W data acquired in all excitation processes may include:
  performing, by using the T1W phase correction data, phase correction on the T1W data acquired in all the excitation processes, and performing image reconstruction by using all T1W data obtained after the phase correction; and
  the performing image reconstruction on SWI data acquired in all the excitation processes includes: performing, by using the SWI phase correction data, phase correction on the SWI data acquired in all the excitation processes, and performing image reconstruction by using all SWI data obtained after the phase correction.

The acquiring T1W data for an excited echo may include: separately applying a gradient pulse whose accumulated zeroth moment is zero to the target tissue in a phase encoding direction and the slice selection encoding direction.

The acquiring T1W data for an excited echo may include: acquiring the T1W data in an EPI acquisition manner for the excited echo; or acquiring the T1W data in a spiral (SPIRAL) acquisition manner for the excited echo.

After the T1W data acquisition is completed and before the preset SWI data acquisition time arrives, the method may further include: performing first-moment flow compensation in a readout direction, a phase encoding direction, and the slice selection encoding direction for the excited echo.

The performing first-moment flow compensation in a readout direction for the excited echo includes: performing first-moment flow compensation in the readout direction for the excited echo according to the following formula:

$$m_{1,r} = m_{0,r\text{-}prephase} \cdot \Delta t_{r\text{-}prephase} + \Sigma_{n=0}^{N-1}(m_{0,n} \cdot \Delta t_n) + \Sigma_{m=0}^{M_{center}}(m_{0,m} \cdot \Delta t_m)$$

where $m_{1,r}$ is a first moment that requires compensation in the readout direction for the excited echo; $m_{0,r\text{-}prephase}$ is a zeroth moment of a T1W pre-phasing gradient pulse in the readout direction; $\Delta t_{r\text{-}prephase}$ is a time interval from a center of the T1W pre-phasing gradient pulse in the readout direction to an echo center of SWI data acquisition; $m_{0,n}$ is a zeroth moment of an $n^{th}$ T1W readout gradient pulse, and N is a quantity of T1W readout gradient pulses; $\Delta t_n$ is a time interval from a center of the $n^{th}$ T1W readout gradient pulse to the echo center of SWI data acquisition; $m_{0,m}$ is a zeroth moment of an $m^{th}$ SWI readout gradient pulse, and M is a quantity of SWI readout gradient pulses; and $\Delta t_m$ is a time interval from a center of the $m^{th}$ SWI readout gradient pulse to the echo center of SWI data acquisition, and $M_{center} = (M-1)/2$.

The performing first-moment flow compensation in a phase encoding direction for the excited echo may include: performing first-moment flow compensation in the phase encoding direction for the excited echo according to the following formula:

$$m_{1,p} = m_{0,p\text{-}prephase1} \cdot \Delta t_{p\text{-}prephase1} + m_{0,p\text{-}rewinder1} \cdot \Delta t_{p\text{-}rewinder1} + \Sigma_{n=0}^{N-2}(m_{0,n} \cdot \Delta t_n) + \Sigma_{m=0}^{M_{center}-1}(m_{0,m} \cdot \Delta t_m)$$

where $m_{1,p}$ is a first moment that requires compensation in the phase encoding direction for the excited echo; $m_{0,p\text{-}prephase1}$ is a zeroth moment of a pre-phasing gradient pulse in the phase encoding direction; $\Delta t_{p\text{-}prephase1}$ is a time interval from a center of the pre-phasing gradient pulse in the phase encoding direction to an echo center of SWI data acquisition; $m_{0,p\text{-}rewinder1}$ is a zeroth moment of a rewinder gradient pulse in the phase encoding direction; $\Delta t_{p\text{-}rewinder1}$ is a time interval from a center of the rewinder gradient pulse in the phase encoding direction to the echo center of SWI data acquisition; $m_{0,n}$ is a zeroth moment of an $n^{th}$ T1W phase encoding gradient pulse; $\Delta t_n$ is a time interval from a center of the $n^{th}$ T1W phase encoding gradient pulse to the echo center of SWI data acquisition; N-1 is a quantity of T1W phase encoding gradient pulses; $m_{0,m}$ is a zeroth moment of an $m^{th}$ SWI phase encoding gradient pulse; and $\Delta t_m$ is a time interval from a center of the $m^{th}$ SWI phase encoding gradient pulse to the echo center of SWI data acquisition, $M_{center} = M/2$, and M is a quantity of SWI phase encoding gradient pulses.

The performing first-moment flow compensation in a slice selection encoding direction for the excited echo may include: performing first-moment flow compensation in the slice selection encoding direction for the excited echo according to the following formula:

$$m_{1,s} = m_{0,s\text{-}encoding1} \cdot \Delta t_{s\text{-}encoding1} + m_{0,s\text{-}rewinder1} \cdot \Delta t_{s\text{-}rewinder1} + m_{0,s\text{-}encoding2} \cdot \Delta t_{s\text{-}encoding2}$$

where $m_{1,s}$ is a first moment that requires compensation in the slice selection encoding direction for the excited echo; $m_{0,s\text{-}encoding1}$ is a zeroth moment of a T1W block encoding gradient pulse; $\Delta t_{s\text{-}encoding1}$ is a time interval from a center of the T1W block encoding gradient pulse to an echo center of SWI data acquisition; $m_{0,s\text{-}rewinder1}$ is a zeroth moment of a rewinder gradient pulse in the slice selection encoding direction; $\Delta t_{s\text{-}rewinder1}$ is a time interval from a center of the rewinder gradient pulse in the slice selection encoding direction to the echo center of SWI data acquisition; $m_{0,s\text{-}encoding2}$ is a zeroth moment of an SWI block encoding gradient pulse; and $\Delta t_{s\text{-}encoding2}$ is a time interval from a center of the SWI block encoding gradient pulse to the echo center of SWI data acquisition.

An apparatus for obtaining T1-weighted (T1W) and susceptibility-weighted imaging (SWI) images may include:

a data acquisition module configured to: in a 3D echo planar imaging (EPI) process with a plurality of times of excitation, for each time of excitation, first perform radio frequency pulse excitation on target tissue, and simultaneously apply a slice selection gradient pulse to the target tissue in a slice selection encoding direction; after the radio frequency pulse excitation and the slice selection gradient pulse application are completed, when a preset T1W data acquisition time arrives, acquire T1W data for an excited echo; and after the T1W data acquisition is completed, when a preset SWI data acquisition time arrives, acquire SWI data for the excited echo; and an image reconstruction module configured to perform image reconstruction on T1W data acquired in all excitation processes to obtain a T1W image of the target tissue, and perform image reconstruction on SWI data acquired in all the excitation processes to obtain an SWI image of the target tissue.

A magnetic resonance imaging system includes an apparatus for obtaining T1-weighted (T1W) and susceptibility-weighted imaging (SWI) images described above.

In the embodiments of the present disclosure, in one excitation process, after radio frequency excitation, when an SWI data acquisition time arrives, T1W data is acquired, so that both the T1W data and SWI data are obtained in the one excitation process, to speed up the obtaining of a T1W image and an SWI image, and reduce an MRI scanning time, thereby facilitating application to a low-field MRI scanner.

A contrast ratio of T1W imaging can well describe a gray matter (GM) and a white matter (WM), and therefore is essential in brain MRI examinations. Currently, brain T1W imaging is usually performed by using a two-dimensional spin-echo sequence or a gradient-echo sequence. There is also evidence that brain T1W data acquisition can be accelerated by using 3D EPI.

SWI can provide an enhanced image contrast ratio for tissues with different susceptibilities. A conventional technology for obtaining an SWI image is a full flow compensation 3D-gradient-echo (GRE) sequence. This usually requires a relatively long scanning time.

Embodiments of the present disclosure provide a method for obtaining both T1W data and SWI data in one excitation process, to speed up the obtaining of a T1W image and an SWI image, and reduce an MRI scanning time, thereby facilitating application to a low-field MRI scanner.

FIG. 1 is a flowchart of a method 100 for obtaining a T1W image and a SWI image according to an exemplary embodiment of the present disclosure. The method may include the following operations/steps:

Step 101: In a three-dimensional (3D) EPI process with a plurality of times of excitation, for each time of excitation, radio frequency pulse excitation is first performed on target tissue, and a slice selection gradient pulse is simultaneously applied to the target tissue in a slice selection encoding direction; after the radio frequency pulse excitation and the slice selection gradient pulse application are completed, when a preset T1W data acquisition time arrives, T1W data is acquired for an excited echo; and after the T1W data acquisition is completed, when a preset SWI data acquisition time arrives, SWI data is acquired for the excited echo.

Since 3D EPI is described in this embodiment of the present disclosure, "slice selection" mentioned in this embodiment of the present disclosure is slice selection in 3D magnetic resonance imaging, and a "slice" herein has a thickness and may be understood as a "block".

Step 102: Image reconstruction is performed on T1W data acquired in all excitation processes to obtain a T1W image of the target tissue, and image reconstruction is performed on SWI data acquired in all the excitation processes to obtain an SWI image of the target tissue.

In the above embodiment, in one excitation process, after radio frequency excitation, when an SWI data acquisition time arrives, T1W data is acquired, so that both the T1W data and SWI data are obtained in the one excitation process, to speed up the obtaining of a T1W image and an SWI image, and reduce an MRI scanning time, thereby facilitating application to a low-field MRI scanner.

In an exemplary embodiment, before step 102, the method further includes: performing radio frequency pulse excitation on the target tissue, and simultaneously applying the slice selection gradient pulse to the target tissue in the slice selection encoding direction; after the radio frequency pulse excitation and the slice selection gradient pulse application are completed, when a preset T1W phase correction data acquisition time arrives, acquiring T1W phase correction data; and after the T1W phase correction data acquisition is completed, when a preset SWI phase correction data acquisition time arrives, acquiring SWI phase correction data.

In step 102, the performing image reconstruction on T1W data acquired in all excitation processes includes: performing, by using the T1W phase correction data, phase correction on the T1W data acquired in all the excitation processes, and performing image reconstruction by using all T1W data obtained after the phase correction; and the performing image reconstruction on SWI data acquired in all the excitation processes includes: performing, by using the SWI phase correction data, phase correction on the SWI data acquired in all the excitation processes, and performing image reconstruction by using all SWI data obtained after the phase correction.

According to the above embodiment, phase correction is performed on the acquired T1W data and SWI data, thereby improving quality of reconstructed images.

In an exemplary embodiment, in step 101, the acquiring of T1W data for an excited echo includes: separately applying a gradient pulse whose accumulated zeroth moment is zero to the target tissue in a phase encoding direction and the slice selection encoding direction.

In an exemplary embodiment, in step 101, the acquiring T1W data for an excited echo includes: acquiring the T1W data in an EPI acquisition manner for the excited echo; or acquiring the T1W data in a spiral (SPIRAL) acquisition manner for the excited echo.

In an exemplary embodiment, in step 101, after the T1W data acquisition is completed and before the preset SWI data acquisition time arrives, the method further includes: performing first-moment flow compensation in a readout direction, a phase encoding direction, and the slice selection encoding direction for the excited echo.

In an exemplary embodiment, in step 101, the performing first-moment flow compensation in the slice selection direction for the excited echo includes: performing first-moment flow compensation in the readout direction for the excited echo according to the following formula:

$$m_{1,r} = m_{0,r\text{-}prephase} \cdot \Delta t_{r\text{-}prephase} + \Sigma_{n=0}^{N-1}(m_{0,n} \cdot \Delta t_n) + \Sigma_{m=0}^{M_{center}}(m_{0,m} \cdot \Delta t_m)$$

where $m_{1,r}$ is a first moment that requires compensation in the readout direction for the excited echo; $m_{0,r\text{-}prephase}$ is a zeroth moment of a T1W pre-phasing gradient pulse (set to $G_{r\text{-}prephase}$) in the readout direction; $\Delta t_{r\text{-}prephase}$ is a time interval from a center of $G_{r\text{-}prephase}$ to an echo center (set to TEswi) of SWI data acquisition; $m_{0,n}$ is a zeroth moment of an $n^{th}$ T1W readout gradient pulse (set to $G_{r1\text{-}n}$); $\Delta t_n$ is a time interval from a center of $G_{r1\text{-}n}$ to TEswi; N is a quantity of T1W readout gradient pulses; $m_{0,m}$ is a zeroth moment of an $m^{th}$ SWI readout gradient pulse (set to $G_{r2\text{-}m}$); and $\Delta t_m$ is a time interval from a center of $G_{r2\text{-}m}$ to TEswi, $M_{center}=(M-1)/2$, and M is a quantity of SWI readout gradient pulses.

In an exemplary embodiment, in step 101, the performing first-moment flow compensation in a phase encoding direction for the excited echo includes: performing first-moment flow compensation in the phase encoding direction for the excited echo according to the following formula:

$$m_{1,p} = m_{0,p\text{-}prephase1} \cdot \Delta t_{p\text{-}prephase1} + m_{0,p\text{-}rewinder1} \cdot \Delta t_{p\text{-}rewinder1} + \Sigma_{n=0}^{N-2}(m_{0,n} \cdot \Delta t_n) + \Sigma_{m=0}^{M_{center}-1}(m_{0,m} \cdot \Delta t_m)$$

where $m_{1,p}$ is a first moment that requires compensation in the phase encoding direction for the excited echo; $m_{0,p\text{-}prephase1}$ is a zeroth moment of a pre-phasing gradient pulse (set to $G_{p\text{-}prephase1}$) in the phase encoding direction; $\Delta t_{p\text{-}prephase1}$ is a time interval from a center of $G_{p\text{-}prephase1}$ to an echo center (set to TEswi) of SWI data acquisition; $m_{0,p\text{-}rewinder1}$ is a zeroth moment of a rewinder gradient pulse (set to $G_{p\text{-}rewinder1}$) in the phase encoding direction; $\Delta t_{p\text{-}rewinder1}$ is a time interval from a center of $G_{p\text{-}rewinder1}$ to TEswi; $m_{0,n}$ is a zeroth moment of an $n^{th}$ T1W phase encoding gradient pulse (set to $G_{p\text{-}blip1\text{-}n}$); $\Delta t_n$ is a time interval from a center of $G_{p\text{-}blip1\text{-}n}$ to TEswi; N−1 is a quantity of T1W phase encoding gradient pulses; $m_{0,m}$ is a zeroth moment of an $m^{th}$ SWI phase encoding gradient pulse (set to $G_{p\text{-}blip2\text{-}m}$); and $\Delta t_m$ is a time interval from a center of $G_{p\text{-}blip2\text{-}m}$ to TEswi, $M_{center}=M/2$, and M is a quantity of SWI phase encoding gradient pulses.

In an exemplary embodiment, in step 101, the performing first-moment flow compensation in the slice selection encoding direction for the excited echo includes: performing first-moment flow compensation in the slice selection encoding direction for the excited echo according to the following formula:

$$m_{1,s} = m_{0,s\text{-}encoding1} \cdot \Delta t_{s\text{-}encoding1} + m_{0,s\text{-}rewinder1} \cdot \Delta t_{s\text{-}rewinder1} + m_{0,s\text{-}encoding2} \cdot \Delta t_{s\text{-}encoding2}$$

where $m_{1,s}$ is a first-moment flow compensation gradient that requires compensation in the slice selection encoding direction for the excited echo; $m_{0,s\text{-}encoding1}$ is a zeroth moment of a T1W block encoding gradient pulse (set to $G_{s\text{-}encoding1}$); $\Delta t_{s\text{-}encoding1}$ is a time interval from a center of $G_{s\text{-}encoding1}$ to an echo center (set to TEswi) of SWI data acquisition; $m_{0,s\text{-}rewinder1}$ is a zeroth moment of a rewinder gradient pulse (set to $G_{s\text{-}rewinder1}$) in the slice selection gradient pulse; $\Delta t_{s\text{-}rewinder1}$ is a time interval from a center of $G_{s\text{-}rewinder1}$ to TEswi; $m_{0,s\text{-}encoding2}$ is a zeroth moment of an SWI block encoding gradient pulse (set to $G_{s\text{-}encoding2}$); and $\Delta t_{s\text{-}encoding2}$ is a time interval from a center of $G_{s\text{-}encoding2}$ to TEswi.

The above first-moment flow compensation method performed in the readout direction, the phase encoding direction, and the slice selection encoding direction for the excited echo is particularly applicable to a scenario in which the T1W data is acquired in the EPI acquisition manner.

According to the above embodiment, first-moment flow compensation is performed in the readout direction, the phase encoding direction, and the slice selection encoding direction for the excited echo, so that arterial signal contamination in the SWI image is eliminated, and quality of the SWI image is improved.

Figure 2:
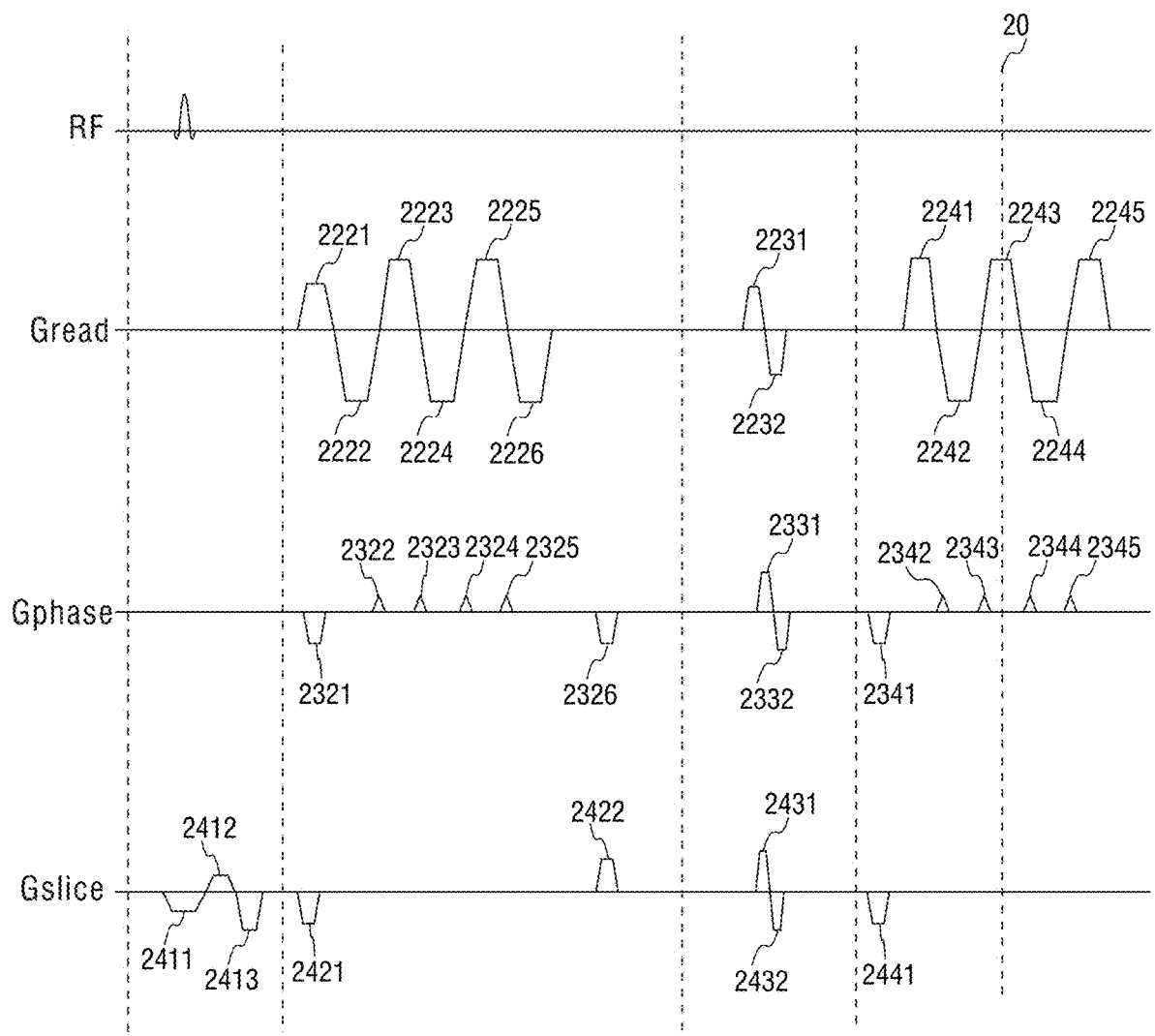
FIG. 2 is a schematic diagram of sequences used in one excitation process when a T1W image and an SWI image are obtained in an application example according to an exemplary embodiment of the present disclosure.

FIG. 2 is a schematic diagram of sequences used in one excitation process when a T1W image and an SWI image are obtained in an application example of the present disclosure.

RF is a block-selective excitation pulse transmitted to target tissue.

Gread is a gradient field applied to the target tissue in a readout direction. 2221 is a pre-phasing gradient pulse (set to $G_{r\text{-}prephase}$) in the readout direction. 2222-2226 are T1W readout gradient pulses (set to $G_{r1\text{-}n}$, where n is a pulse sequence number of the T1W readout gradient pulse, and n=0, 1, 2, 3, 4). 2231-2232 are flow compensation gradient pulses in the readout direction. 2241-2245 are SWI readout gradient pulses (set to $G_{r2\text{-}m}$, where m is a pulse sequence number of the SWI readout gradient pulse, and m=0, 1, 2, 3, 4). 20 is an echo center (set to TEswi) of SWI data acquisition. In this example, a total quantity N of T1W readout gradient pulses is 5, and a total quantity M of SWI readout gradient pulses is 5.

Gphase is a gradient field applied to the target tissue in a phase encoding direction. 2321 is a T1W pre-phasing gradient pulse (set to $G_{p\text{-}prephase1}$) in the phase encoding direction. 2322-2325 are T1W phase encoding gradient pulses (set to $G_{p\text{-}blip1\text{-}n}$, where n is a pulse sequence number of the phase encoding gradient pulse, and n=0, 1, 2, 3). 2326 is a rewinder gradient pulse (set to $G_{p\text{-}rewinder1}$) in the phase encoding direction. 2331-2332 are flow compensation gradient pulses in the phase encoding direction. 2341 is an SWI pre-phasing gradient pulse (set to $G_{p\text{-}prephase2}$) in the phase encoding direction. 2342-2345 are SWI phase encoding gradient pulses (set to $G_{p\text{-}blip2\text{-}m}$, where m is a pulse sequence number of the SWI phase encoding gradient pulse, and m=0, 1, 2, 3). In this example, a total quantity of T1W phase encoding gradient pulses is N−1=4, and a total quantity of SWI phase encoding gradient pulses is M=4.

Gslice is a gradient field applied to the target tissue in a slice selection encoding direction. 2411-2413 are slice selection gradient pulses. 2421 is a T1W block encoding gradient pulse (set to $G_{s\text{-}encoding1}$). 2422 is a rewinder gradient pulse (set to $G_{s\text{-}rewinder1}$) in the slice selection encoding direction. 2431-2432 are flow compensation gradient pulses in the slice selection encoding direction. 2441 is an SWI block encoding gradient pulse.

Figure 3:
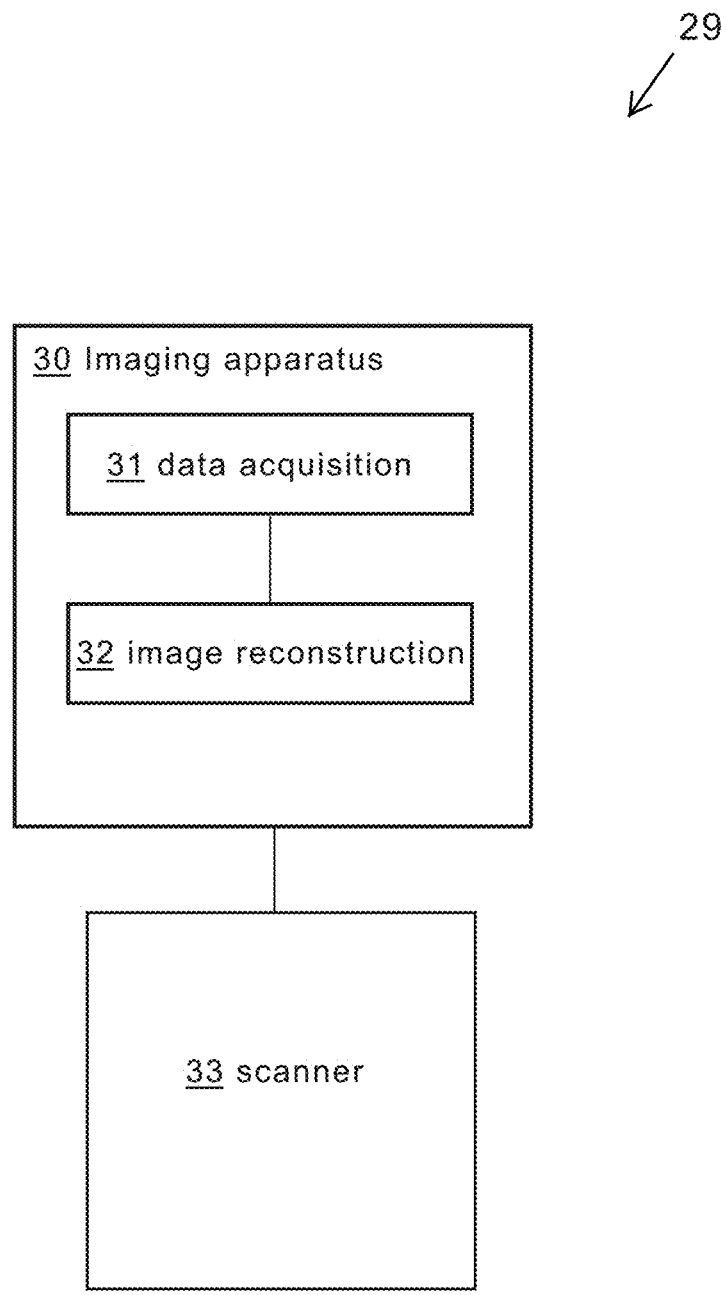
FIG. 3 is a schematic diagram of a structure of an MRI system including an apparatus for obtaining T1W and SWI images and a scanner, according to an exemplary embodiment of the present disclosure.

FIG. 3 is a schematic diagram of a structure of an MRI system 29 including an apparatus 30 for obtaining T1W and SWI images and a scanner 33 according to an exemplary embodiment of the present disclosure. The apparatus 30 may include: a data acquisition module 31 and an image reconstruction module 32. The apparatus 30 may be referred to herein as controller 30. In an exemplary embodiment, the apparatus 30 may include processing circuitry that is configured to perform one or more operations and/or functions of the apparatus 30, which may include controlling the operation of the MRI system 29. The scanner 33 may include a magnet unit and a patient receiving region surrounded by the scanner 33 for receiving a patient. The main magnet may generate a strong and constant main magnetic field. Furthermore, the scanner 33, in particular the magnet unit, may have a gradient coil unit for generating magnetic field gradients that are used for position encoding during an imaging process.

The data acquisition module 31 may be referred to herein as data acquisition circuitry 31. In an exemplary embodiment, the data acquisition module 31 may include processing circuitry that is configured to perform one or more operations and/or functions of the data acquisition module 31.

The image reconstruction module 32 may be referred to herein as image reconstruction circuitry 32 and/or image reconstructor 32. In an exemplary embodiment, the image reconstruction module 32 may include processing circuitry that is configured to perform one or more operations and/or functions of the image reconstruction module 32.

The data acquisition module 31 may be configured to: in a 3D EPI process with a plurality of times of excitation, for each time of excitation, first perform radio frequency pulse excitation on target tissue, and simultaneously apply a slice selection gradient pulse to the target tissue in a slice selection encoding direction; after the radio frequency pulse excitation and the slice selection gradient pulse application are completed, when a preset T1W data acquisition time arrives, acquire T1W data for an excited echo; and after the T1W data acquisition is completed, when a preset SWI data acquisition time arrives, acquire SWI data for the excited echo.

The image reconstruction module 32 may be configured to perform image reconstruction on T1W data acquired in all excitation processes to obtain a T1W image of the target tissue, and perform image reconstruction on SWI data acquired in all the excitation processes to obtain an SWI image of the target tissue.

In an exemplary embodiment, the data acquisition module 31 is further configured to: perform radio frequency pulse excitation on the target tissue, and simultaneously apply the slice selection gradient pulse to the target tissue in the slice selection encoding direction; after the radio frequency pulse excitation and the slice selection gradient pulse application are completed, when a preset T1W phase correction data acquisition time arrives, acquire T1W phase correction data; and after the T1W phase correction data acquisition is completed, when a preset SWI phase correction data acquisition time arrives, acquire SWI phase correction data.

The image reconstruction module 32 performing image reconstruction on T1W data acquired in all excitation processes includes: performing, by using the T1W phase correction data, phase correction on the T1W data acquired in all the excitation processes, and performing image reconstruction by using all T1W data obtained after the phase correction.

The image reconstruction module 32 performing image reconstruction on SWI data acquired in all the excitation processes includes: performing, by using the SWI phase correction data, phase correction on the SWI data acquired in all the excitation processes, and performing image reconstruction by using all SWI data obtained after the phase correction.

In an exemplary embodiment, the data acquisition module 31 acquiring T1W data for an excited echo includes: separately applying a gradient pulse whose accumulated zeroth moment is zero to the target tissue in a phase encoding direction and the slice selection encoding direction.

In an exemplary embodiment, the data acquisition module 31 acquiring T1W data for an excited echo includes: acquiring the T1W data in an EPI acquisition manner for the excited echo; or acquiring the T1W data in a SPIRAL acquisition manner for the excited echo.

In an exemplary embodiment, after the T1W data acquisition is completed and before the preset SWI data acquisition time arrives, the data acquisition module 31 is further configured to perform first-moment flow compensation in a readout direction, a phase encoding direction, and the slice selection encoding direction for the excited echo.

In an exemplary embodiment, the data acquisition module 31 performing first-moment flow compensation in a readout direction for the excited echo includes: performing first-moment flow compensation in the readout direction for the excited echo according to the following formula:

$$m_{1,r} = m_{0,r\text{-}prephase} \cdot \Delta t_{r\text{-}prephase} + \Sigma_{n=0}^{N-1}(m_{0,n} \cdot \Delta t_n) + \Sigma_{m=0}^{M_{center}}(m_{0,m} \cdot \Delta t_m)$$

where $m_{1,r}$ is a first moment that requires compensation in the readout direction for the excited echo; $m_{0,r\text{-}prephase}$ is a zeroth moment of a T1W pre-phasing gradient pulse in the readout direction; $\Delta t_{r\text{-}prephase}$ is a time interval from a center of the T1W pre-phasing gradient pulse in the readout direction to an echo center of SWI data acquisition; $m_{0,n}$ is a zeroth moment of an $n^{th}$ T1W readout gradient pulse, and N is a quantity of T1W readout gradient pulses; $\Delta t_n$ is a time interval from a center of the $n^{th}$ T1W readout gradient pulse to the echo center of SWI data acquisition; $m_{0,m}$ is a zeroth moment of an $m^{th}$ SWI readout gradient pulse, and M is a quantity of SWI readout gradient pulses; and $\Delta t_m$ is a time interval from a center of the $m^{th}$ SWI readout gradient pulse to the echo center of SWI data acquisition, and $M_{center} = (M-1)/2$.

In an exemplary embodiment, the data acquisition module 31 performing first-moment flow compensation in a phase encoding direction for the excited echo includes: performing first-moment flow compensation in the phase encoding direction for the excited echo according to the following formula:

$$m_{1,p} = m_{0,p\text{-}prephase1} \cdot \Delta t_{p\text{-}prephase1} + m_{0,p\text{-}rewinder1} \cdot \Delta t_{p\text{-}rewinder1} + \Sigma_{n=0}^{N-2}(m_{0,n} \cdot \Delta t_n) + \Sigma_{m=0}^{M_{center}-1}(m_{0,m} \cdot \Delta t_m)$$

where $m_{1,p}$ is a first moment that requires compensation in the phase encoding direction for the excited echo; $m_{0,p\text{-}prephase1}$ is a zeroth moment of a pre-phasing gradient pulse in the phase encoding direction; $\Delta t_{p\text{-}prephase1}$ is a time interval from a center of the pre-phasing gradient pulse in the phase encoding direction to an echo center of SWI data acquisition; $m_{0,p\text{-}rewinder1}$ is a zeroth moment of a rewinder gradient pulse in the phase encoding direction; $\Delta t_{p\text{-}rewinder1}$ is a time interval from a center of the rewinder gradient pulse in the phase encoding direction to the echo center of SWI data acquisition; $m_{0,n}$ is a zeroth moment of an $n^{th}$ T1W phase encoding gradient pulse; $\Delta t_n$ is a time interval from a center of the $n^{th}$ T1W phase encoding gradient pulse to the echo center of SWI data acquisition; N−1 is a quantity of T1W phase encoding gradient pulses; $m_{0,m}$ is a zeroth moment of an $m^{th}$ SWI phase encoding gradient pulse; and $\Delta t_m$ is a time interval from a center of the $m^{th}$ SWI phase encoding gradient pulse to the echo center of SWI data acquisition, $M_{center} = M/2$, and M is a quantity of SWI phase encoding gradient pulses.

In an exemplary embodiment, the data acquisition module 31 performing first-moment flow compensation in the slice selection encoding direction for the excited echo includes:

performing first-moment flow compensation in the slice selection encoding direction for the excited echo according to the following formula:

$$m_{1,s}=m_{0,s\text{-}encoding1}\cdot\Delta t_{s\text{-}encoding1}+m_{0,s\text{-}rewinder1}\cdot\Delta t_{s\text{-}rewinder1}+m_{0,s\text{-}encoding2}\cdot\Delta t_{s\text{-}encoding2}$$

where $m_{1,s}$ is a first moment that requires compensation in the slice selection encoding direction for the excited echo; $m_{0,s\text{-}encoding1}$ is a zeroth moment of a T1W block encoding gradient pulse; $\Delta t_{s\text{-}encoding1}$ is a time interval from a center of the T1W block encoding gradient pulse to an echo center of SWI data acquisition; $m_{0,s\text{-}rewinder1}$ is a zeroth moment of a rewinder gradient pulse in the slice selection encoding direction; $\Delta t_{s\text{-}rewinder1}$ is a time interval from a center of the rewinder gradient pulse in the slice selection encoding direction to the echo center of SWI data acquisition; $m_{0,s\text{-}encoding2}$ is a zeroth moment of an SWI block encoding gradient pulse; and $\Delta t_{s\text{-}encoding2}$ is a time interval from a center of the SWI block encoding gradient pulse to the echo center of SWI data acquisition.

A magnetic resonance imaging system 29 provided in an embodiment of the present disclosure may include an apparatus (30) for obtaining a T1W image and an SWI image provided in any one of the above embodiments, and scanner (33).

In the embodiments of the present disclosure, geometric parameters for T1W data acquisition may be the same as or different from geometric parameters for SWI data acquisition. The geometric parameters are, for example, a size of an image matrix and a field of view (FOV).

The embodiments of the present disclosure may be applied to brain MRI.

The above descriptions are merely exemplary embodiments of the present disclosure, but not intended to limit the present disclosure. Any modifications, equivalent substitutions, improvements, etc. made within the spirit and principle of the present disclosure should be included within the scope of protection of the present disclosure.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules" "units" or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

100 method
101-102 operations
20 Echo center of SWI data acquisition
2221 Pre-phasing gradient pulse in a readout direction
2222-2226 T1W readout gradient pulses
2231-2232 Flow compensation gradient pulses in the readout direction
2241-2245 SWI readout gradient pulses
2321 T1W pre-phasing gradient pulse in a phase encoding direction
2322-2325 T1W phase encoding gradient pulses
2326 Rewinder gradient pulse in the phase encoding direction
2331-2332 Flow compensation gradient pulses in the phase encoding direction
2341 SWI pre-phasing gradient pulse in the phase encoding direction
2342-2345 SWI phase encoding gradient pulses
2411-2413 Slice selection gradient pulses
2421 T1W block encoding gradient pulse
2422 Rewinder gradient pulse in the slice selection encoding direction
2431-2432 Flow compensation gradient pulses in the slice selection encoding direction
2441 SWI block encoding gradient pulse
29 MRI system
30 Apparatus for obtaining T1W and SWI images
31 Data acquisition module
32 Image reconstruction module
33 scanner

The invention claimed is:

1. A method for obtaining T1-weighted (T1W) and susceptibility-weighted imaging (SWI) images, comprising:
in a 3D echo planar imaging (EPI) process with a plurality of times of excitation, for each time of excitation:
performing radio frequency pulse excitation on target tissue, and simultaneously applying a slice selection gradient pulse to the target tissue in a slice selection encoding direction,
after the radio frequency pulse excitation and the slice selection gradient pulse application are completed, when a preset T1W data acquisition time arrives, acquiring T1W data for an excited echo, and
after the T1W data acquisition is completed, when a preset SWI data acquisition time arrives, acquiring SWI data for the excited echo;
performing image reconstruction on T1W data acquired in all excitation processes to obtain a T1W image of the target tissue; and
performing image reconstruction on SWI data acquired in all the excitation processes to obtain an SWI image of the target tissue.

2. An apparatus for obtaining T1-weighted (T1W) and susceptibility-weighted imaging (SWI) images, comprising:
a data acquisition module configured to: in a 3D echo planar imaging (EPI) process with a plurality of times of excitation, for each time of excitation, perform radio frequency pulse excitation on target tissue, and simultaneously apply a slice selection gradient pulse to the target tissue in a slice selection encoding direction; after the radio frequency pulse excitation and the slice selection gradient pulse application are completed, when a preset T1W data acquisition time arrives, acquire T1W data for an excited echo; and after the T1W data acquisition is completed, when a preset SWI data acquisition time arrives, acquire SWI data for the excited echo; and
an image reconstruction module configured to perform image reconstruction on T1W data acquired in all excitation processes to obtain a T1W image of the target tissue, and perform image reconstruction on SWI data acquired in all excitation processes to obtain an SWI image of the target tissue.

3. An apparatus for obtaining T1-weighted (T1W) and susceptibility-weighted imaging (SWI) images, comprising:
one or more processors; and
memory storing instructions that, when executed by the one or more processors, configure the apparatus to:
in a 3D echo planar imaging (EPI) process with a plurality of times of excitation, for each time of excitation: perform radio frequency pulse excitation on target tissue, and simultaneously apply a slice selection gradient pulse to the target tissue in a slice selection encoding direction, after the radio frequency pulse excitation and the slice selection gradient pulse application are completed, when a preset T1W data acquisition time arrives, acquire T1W data for an excited echo, and after the T1W data acquisition is completed, when a preset SWI data acquisition time arrives, acquire SWI data for the excited echo;
perform image reconstruction on T1W data acquired in all excitation processes to obtain a T1W image of the target tissue; and
perform image reconstruction on SWI data acquired in all the excitation processes to obtain an SWI image of the target tissue.

4. The method according to claim 1, wherein:
before the performing image reconstruction on T1W data acquired in all excitation processes, the method further comprises:
performing radio frequency pulse excitation on the target tissue, and simultaneously applying the slice selection gradient pulse to the target tissue in the slice selection encoding direction;
after the radio frequency pulse excitation and the slice selection gradient pulse application are completed, when a preset T1W phase correction data acquisition time arrives, acquiring T1W phase correction data; and
after the T1W phase correction data acquisition is completed, when a preset SWI phase correction data acquisition time arrives, acquiring SWI phase correction data;
the performing image reconstruction on T1W data acquired in all excitation processes comprises: performing, by using the T1W phase correction data, phase correction on the T1W data acquired in all the excitation processes, and performing image reconstruction by using all T1W data obtained after the phase correction; and the performing image reconstruction on SWI data acquired in all the excitation processes comprises: performing, by using the SWI phase correction data, phase correction on the SWI data acquired in all the excitation processes, and performing image reconstruction by using all SWI data obtained after the phase correction.

5. The method according to claim 1, wherein the acquiring T1W data for an excited echo comprises: separately applying a gradient pulse whose accumulated zeroth moment is zero to the target tissue in a phase encoding direction and the slice selection encoding direction.

6. The method according to claim 1, wherein the acquiring T1W data for an excited echo comprises:
acquiring the T1W data in an EPI acquisition manner for the excited echo; or
acquiring the T1W data in a spiral (SPIRAL) acquisition manner for the excited echo.

7. The method according to claim 1, wherein, after the T1W data acquisition is completed and before the preset SWI data acquisition time arrives, the method further comprises: performing first-moment flow compensation in a readout direction, a phase encoding direction, and the slice selection encoding direction for the excited echo.

8. A non-transitory computer-readable storage medium with an executable program stored thereon, that when executed, instructs a processor to perform the method of claim 1.

9. A magnetic resonance imaging system, comprising an apparatus for obtaining T1-weighted (T1W) and susceptibility-weighted imaging (SWI) images according to claim 2.

10. A magnetic resonance imaging system, comprising an apparatus for obtaining T1-weighted (T1W) and susceptibility-weighted imaging (SWI) images according to claim 3.

11. The method according to claim 7, wherein the performing first-moment flow compensation in a readout direction for the excited echo comprises: performing first-moment flow compensation in the readout direction for the excited echo according to the following formula:

$$m_{1,r} = m_{0,r\text{-}prephase} \cdot \Delta t_{r\text{-}prephase} + \Sigma_{n=0}^{N-1}(m_{0,n} \cdot \Delta t_n) + \Sigma_{m=0}^{M_{center}}(m_{0,m} \cdot \Delta t_m)$$

where $m_{1,r}$ is a first moment that requires compensation in the readout direction for the excited echo; $m_{0,r\text{-}prephase}$ is a zeroth moment of a T1W pre-phasing gradient pulse in the readout direction; $\Delta t_{r\text{-}prephase}$ is a time interval from a center of the T1W pre-phasing gradient pulse in the readout direction to an echo center of SWI data acquisition; $m_{0,n}$ is a zeroth moment of an $n^{th}$ T1W readout gradient pulse, and N is a quantity of T1W readout gradient pulses; $\Delta t_n$ is a time interval from a center of the $n^{th}$ T1W readout gradient pulse to the echo center of SWI data acquisition; $m_{0,m}$ is a zeroth moment of an $m^{th}$ SWI readout gradient pulse, and M is a quantity of SWI readout gradient pulses; and $\Delta t_m$ is a time interval from a center of the $m^{th}$ SWI readout gradient pulse to the echo center of SWI data acquisition, and $M_{center} = (M-1)/2$.

12. The method according to claim 7, wherein the performing first-moment flow compensation in a phase encoding direction for the excited echo comprises: performing first-moment flow compensation in the phase encoding direction for the excited echo according to the following formula:

$$m_{1,p} = m_{0,p\text{-}prephase1} \cdot \Delta t_{p\text{-}prephase1} + m_{0,p\text{-}rewinder1} \cdot \Delta t_{p\text{-}rewinder1} + \Sigma_{n=0}^{N-2}(m_{0,n} \cdot \Delta t_n) + \Sigma_{m=0}^{M_{center}-1}(m_{0,m} \cdot \Delta t_m)$$

where $m_{1,p}$ is a first moment that requires compensation in the phase encoding direction for the excited echo; $m_{0,p\text{-}prephase1}$ is a zeroth moment of a pre-phasing gradient pulse in the phase encoding direction; $\Delta t_{p\text{-}prephase1}$ is a time interval from a center of the pre-phasing gradient pulse in the phase encoding direction to an echo center of SWI data acquisition; $m_{0,p\text{-}rewinder1}$ is a zeroth moment of a rewinder gradient pulse in the phase encoding direction; $\Delta t_{p\text{-}rewinder1}$ is a time interval from a center of the rewinder gradient pulse in the phase encoding direction to the echo center of SWI data acquisition; $m_{0,n}$ is a zeroth moment of an $n^{th}$ T1W phase encoding gradient pulse; $\Delta t_n$ is a time interval from a center of the $n^{th}$ T1W phase encoding gradient pulse to the echo center of SWI data acquisition; N−1 is a quantity of T1W phase encoding gradient pulses; $m_{0,m}$ is a zeroth moment of an $m^{th}$ SWI phase encoding gradient pulse; and $\Delta t_m$ is a time interval from a center of the $m^{th}$ SWI phase encoding gradient pulse to the echo center of SWI data acquisition, $M_{center} = M/2$, and M is a quantity of SWI phase encoding gradient pulses.

13. The method according to claim 7, wherein the performing first-moment flow compensation in a slice selection encoding direction for the excited echo comprises: performing first-moment flow compensation in the slice selection encoding direction for the excited echo according to the following formula:

$$m_{1,s} = m_{0,s\text{-}encoding1} \cdot \Delta t_{s\text{-}encoding1} + m_{0,s\text{-}rewinder1} \cdot \Delta t_{s\text{-}rewinder1} + m_{0,s\text{-}encoding2} \cdot \Delta t_{s\text{-}encoding2}$$

where $m_{1,s}$ is a first moment that requires compensation in the slice selection encoding direction for the excited echo; $m_{0,s\text{-}encoding1}$ is a zeroth moment of a T1W block encoding gradient pulse; $\Delta t_{s\text{-}encoding1}$ is a time interval from a center of the T1W block encoding gradient pulse to an echo center of SWI data acquisition; $m_{0,s\text{-}rewinder1}$ is a zeroth moment of a rewinder gradient pulse in the slice selection encoding direction; $\Delta t_{s\text{-}rewinder1}$ is a time interval from a center of the rewinder gradient pulse in the slice selection encoding direction to the echo center of SWI data acquisition; $m_{0,s\text{-}encoding2}$ is a zeroth moment of an SWI block encoding gradient pulse; and $\Delta t_{s\text{-}encoding2}$ is a time interval from a center of the SWI block encoding gradient pulse to the echo center of SWI data acquisition.

* * * * *